(12) United States Patent
Knoell

(10) Patent No.: US 7,287,948 B2
(45) Date of Patent: Oct. 30, 2007

(54) LOAD LIFTER FOR A MOTOR VEHICLE

(76) Inventor: Herbert Knoell, Alter Weg 15, D-71546, Aspach (DE)

( * ) Notice: Subject to any disclaimer, the term of this patent is extended or adjusted under 35 U.S.C. 154(b) by 0 days.

(21) Appl. No.: 10/931,819

(22) Filed: Sep. 1, 2004

(65) Prior Publication Data

US 2006/0045705 A1    Mar. 2, 2006

(51) Int. Cl.
*B60P 1/54* (2006.01)
(52) U.S. Cl. .................. 414/546; 212/180; 414/542
(58) Field of Classification Search ........... 414/542, 414/546; 212/180
See application file for complete search history.

(56) References Cited

U.S. PATENT DOCUMENTS

| | | | | |
|---|---|---|---|---|
| 1,464,131 A | * | 8/1923 | Goodger | 414/542 |
| 1,500,225 A | * | 7/1924 | Bornschein | 212/306 |
| 2,375,800 A | * | 5/1945 | Le Tourneau | 212/295 |
| 2,596,846 A | | 5/1952 | Feigelson | |
| 2,740,535 A | * | 4/1956 | Bill | 212/288 |
| 2,873,869 A | * | 2/1959 | Neaverson | 414/549 |
| 2,941,678 A | * | 6/1960 | Keys | 414/546 |
| 3,167,200 A | * | 1/1965 | Booker | 414/549 |
| 3,227,286 A | * | 1/1966 | Sparrow et al. | 212/310 |
| 3,233,758 A | * | 2/1966 | Darfus | 414/540 |
| 3,341,038 A | * | 9/1967 | Wicklund | 414/542 |
| 3,386,593 A | * | 6/1968 | Sprengel | 212/310 |
| 3,768,671 A | * | 10/1973 | LaVier | 414/556 |
| 3,780,878 A | * | 12/1973 | Morrow | 212/306 |
| 4,058,229 A | * | 11/1977 | Triplett | 414/546 |
| 4,216,941 A | | 8/1980 | Little | |
| 4,265,585 A | * | 5/1981 | Hawkins | 414/541 |
| 4,348,151 A | * | 9/1982 | Olson | 414/542 |

FOREIGN PATENT DOCUMENTS

| | | |
|---|---|---|
| CH | 84 974 | 9/1919 |
| DE | 9 19 012 C | 10/1954 |
| DE | 202 05 847 U1 | 9/2002 |
| GB | 2 066 771 A | 7/1981 |

OTHER PUBLICATIONS

German Search Report dated Mar. 19, 2004.

* cited by examiner

*Primary Examiner*—Thomas J. Brahan
(74) *Attorney, Agent, or Firm*—Quarles & Brady LLP

(57) ABSTRACT

A load lifter for a motor vehicle includes a vertically standing outer support firmly attached to the motor vehicle, having an outer support through whose interior a second load support can be pivoted around an axis located in the lower area. The load support is connected to the outer support by a block and tackle. A load can be suspended from the load support, and can be raised to a vertical position with the help of the block and tackle. Then it can be moved to the other side of the axis with a slight exertion of force, from where lowering is possible with the block and tackle.

9 Claims, 2 Drawing Sheets

LOAD LIFTER FOR A MOTOR VEHICLE

TECHNICAL FIELD

The invention relates to a device for bringing loads into motor vehicles equipped with a loading area, for example station wagons, small transporters, pickups or platform trucks.

BACKGROUND ART

When such motor vehicles are used for transporting small cargos, frequently loads are loaded into the transporter and later removed from them again. Even if the loading occurs at a place where permanently installed loading equipment is available, the unloading often must occur at locations where no such stationary equipment is available. There it is necessary for the driver to remove objects from the vehicle, sometimes under time pressure, that are often of such a weight that they are difficult to move without help. Conversely, it may also be necessary to load individual objects into the vehicle at such locations. Even if the weight is such that the driver could still carry them, because of the large number of such procedures the work may be more than can be expected of one person.

SUMMARY OF THE INVENTION

The object of the invention is to create a possibility for making it simpler in such cases for the person involved to easily load and/or unload motor vehicles, small transporters or the like.

The load lifter, as it is proposed by the invention, is mounted in a motor vehicle. The load support is mounted for pivoting around a rotational axis formed by a shaft in such a way that it can be pivoted across this rotational axis from one side of the rotational axis to the other. The pivoting occurs against a counter-support that is fixed in the motor vehicle. In a motor vehicle that have a very solid body, the counter-support may for example be mounted directly on an upper transverse beam. A mechanism is used to pivot the load support with respect to the counter-support. This mechanism may be operated manually by the operator of the load lifter, or it may possibly also have an electric drive supplied by the electric battery of the motor vehicle.

In a further development of the invention it may be provided that the counter-support is positioned essentially vertically above the axis of the support, and when the support is placed vertically, above the support. That makes it possible to use a mechanism that is mainly loaded under tension.

In another further development of the invention it may be provided that the linkage mechanism between the load support and the counter-support is a block and tackle. The block and tackle is made up of very simple, easy-to-handle and easy-to-service parts. The rollers can be mounted on very simple bearings with little friction, so that the mechanism operates very easily. It is also possible to adjust the reduction, so that just the right effort can be set for the particular weights. There are very simply operating locking devices that prevent the load from dropping if the user is no longer pulling or the rope of the block and tackle comes loose. That means that the load lifter is also very safe.

In order to be able to utilize the loading area well, there may be provision according to the invention for the rotational axis to be located directly above the loading area of the vehicle, so that the available vertical space may also be utilized to the maximum by the load support. Because the length of the load support from the rotational axis to the suspension device determines the maximum distance the load lifter can pivot. After all, the load support itself must be capable of being placed completely inside the motor vehicle when the vehicle is closed.

Since many motor vehicles do not have sufficient strength in their roof design for suspending loads, the invention proposes in a further development that an outer support be placed in the vehicle, to which the counter-support is attached. This support can also be used to receive in its lower area the bearing that forms the rotational axis of the load support. The load bearing is dimensioned so that it can be pivoted under the counter-support at a slight interval.

It may be provided according to the invention that the axis of the load support is positioned in the area of the rear end of the loading area of the motor vehicle. If the vehicle is a pickup or other motor vehicle intended for rougher use, the rotational axis may also be placed behind the loading area on a bumper construction.

The suspension device, for example a simple hook, can be place on the upper crosspiece of the load support in such a way that the load can be applied to various places on this transverse beam.

Additional features, details and advantages of the invention may be seen from the following description of a preferred embodiment, from the claims and the abstract, the wording of both of which is made part of the content of the description by reference, and on the basis of the drawing.

DETAILED DESCRIPTION

Figure 1:
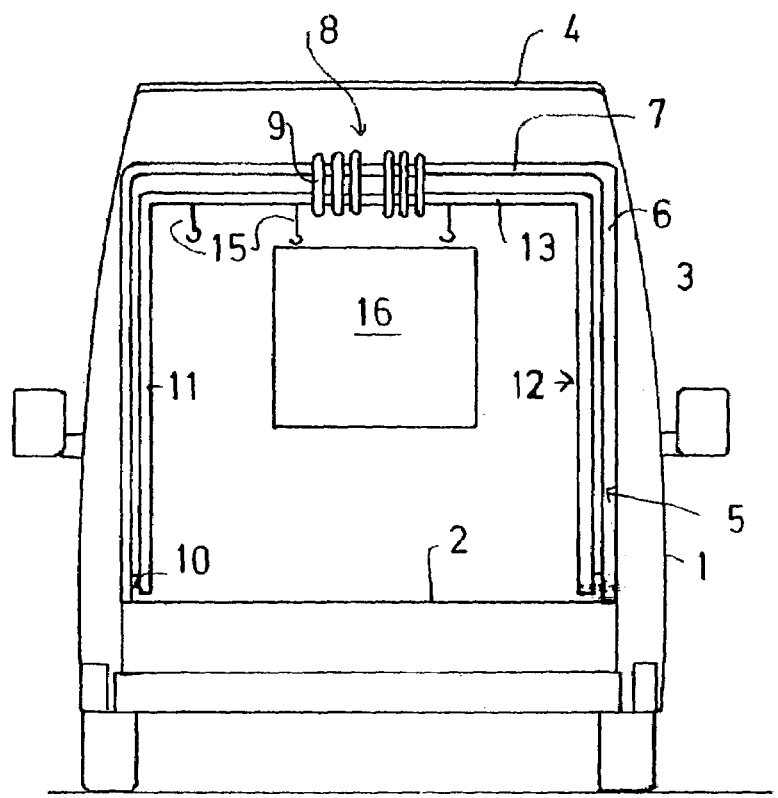
FIG. 1 a schematic view of a load lifter according to the invention, positioned in a delivery van.

FIG. 1 shows in simplified form the view of a delivery van 1 seen from its rear with the doors open. The motor vehicle contains a flat loading area 2, bounded by side walls 3, and a roof 4. The side walls 3 and the roof 4 are generally not sufficiently solid to suspend a load.

Standing on the loading surface, at the lateral bounds of the loading area 2 an outer support 5 is attached, for example firmly bolted, firmly welded or attached in a similar way to the bearing construction of the motor vehicle. This outer support includes two essentially vertically positioned arms 6, which are connected to each other in the area of their upper ends by a horizontal transverse beam 7. The material of this support 5 is a profile that has sufficient strength.

Located in the middle of the upper transverse beam 7 is a counter-support 8, in the form of a set of pulleys for a block and tackle 9.

In the area of the lower end of each of the outer arms 6 of support 5 is a bearing 10 with a rotational axis, on which the lower ends of the arms 11 of a second support 12 are mounted for rotation. The second support 12 is thus able to pivot around the axis 10. The effective length of the support 12 from its axis 10 to its transverse beam 13 is somewhat smaller than the corresponding dimension of the outer support 5, so that the load support 12 can be pivoted through and beneath the counter-support 5.

On the upper transverse beam 13 of the load support 12 in the example shown there are several hooks 15, which form a suspension device. It is shown schematically that a load 16 may be suspended from the two middle hooks. The hooks 15 can be placed along the entire length of the transverse beam 13. That makes it possible to suspend a load 16 both the left and to the right, as well as in the middle. It is naturally also conceivable for a hook to be positioned movably on the transverse beam 13.

Figure 2:
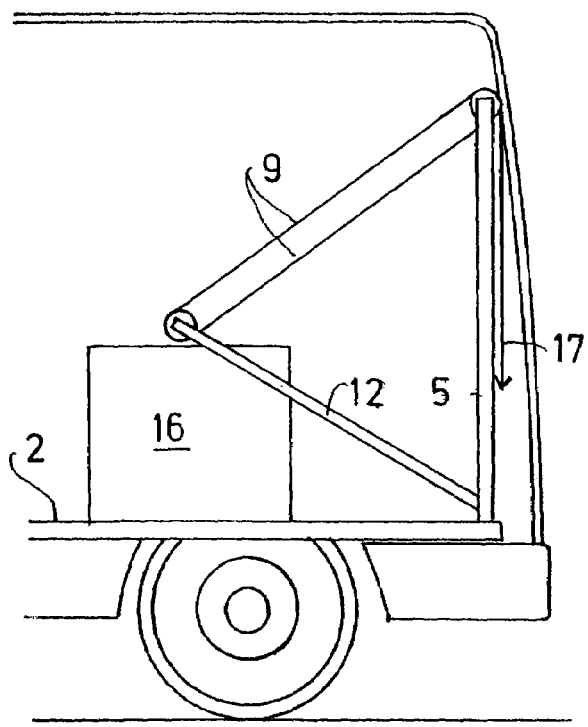
FIG. 2 the side view of the load lifter with a load lowered in the vehicle.
Figure 3:
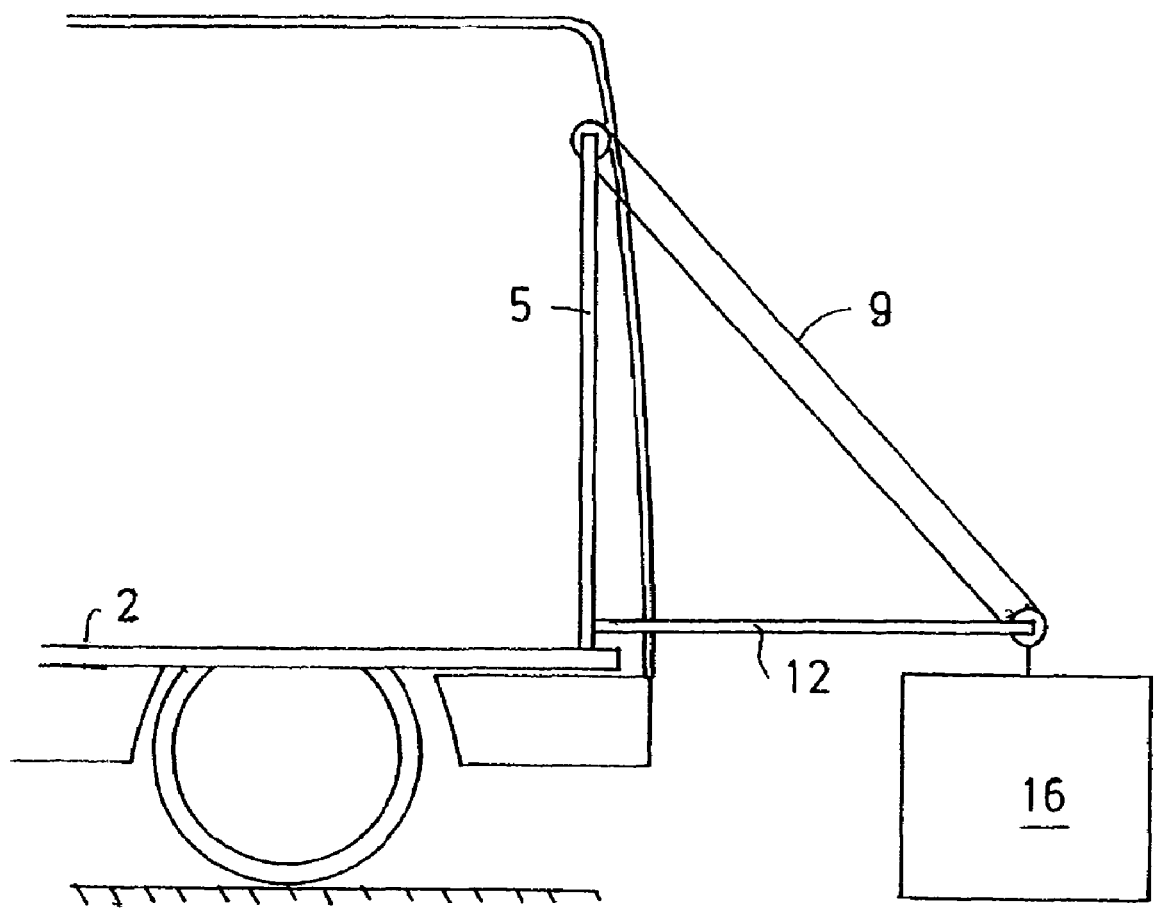
FIG. 3 the side view in the state of setting down or picking up a load.

Now we shall go to FIG. 2. From the position in FIG. 1, in which the load support 12 is standing vertically, it is now pivoted into the interior of the motor vehicle, until the hooks 15 are positioned directly above the load 16. In this position, the load 16 can now be attached to the transverse beam 13 of the load support 12 with the help of the suspension device. Next tension is applied to the block and tackle, as indicated by the arrow 17. This causes the load support 12 to rise up until it is standing vertically. Then the rotational axis 10 of the load support 12 and the transverse beam 7 of the outer support 5 are directly one above the other in a vertical line. Now the user of the load lifter must pull the load and the support 12 horizontally somewhat past this point over to the other side with a slight exertion of force, whereupon the load can be lowered. This can be done by slowly releasing the rope of the block and tackle. The load 16 then drops over to the other side through corresponding pivoting of the load support, until the position in FIG. 3 is reached. Here the load 16 can be detached from the suspension device.

The opposite procedure is naturally also possible.

Since the shaft 10 that forms the rotational axis is located in the area of the rear end of the loading area 2, the load 16 can be placed far outside of the vehicle. It is even possible, if the axis is positioned somewhat above the loading surface, for the load also to be set down at a place that is somewhat lower than the surface on which the vehicle is standing.

The invention can also be used if the vehicle is a non-closed vehicle. The outer support 5, which has the counter-support 8, can be secured for example with braces.

The invention claimed is:

1. Load lifter for a motor vehicle, having a load support positioned in the motor vehicle, the load support having two parallel arms with ends connected by a transverse beam, the load support being rotatable in a vicinity of the ends of the parallel arms around a horizontal axis, and the load support having a suspension device at the transverse beam for suspending the load, the load lifter having further a fixed outer support having two essentially vertically positioned arms, which are connected to each other in an area of upper ends by a horizontal transverse beam, the load support being moved through the outer support when pivoted relative to the horizontal axis, from a position laterally inside of the horizontal axis to a position laterally outside of the horizontal axis, the load lifter having further a counter-support positioned at the transverse beam of the outer support and wherein the load lifter further comprises a linkage mechanism disposed in the middle of the counter-support and connected between the load support and the counter-support so as to allow for easy control by an individual operator.

2. The load lifter according to claim 1, wherein the outer support is positioned substantially and vertically above the axis of the load support, and when the load support is standing vertically the outer support is positioned above the load support.

3. The load lifter according to claim 2, wherein the linkage mechanism that allows for easy control by an individual operator further comprises a block and tackle.

4. The load lifter according to claim 1, wherein the horizontal axis is positioned directly above a loading area of the motor vehicle.

5. The load lifter according to claim 1, wherein the counter-support is positioned on the outer support that is attached on or in the motor vehicle.

6. The device as claimed in claim 1, wherein a bearing that forms the axis is located on the outer support.

7. The load lifter according to claim 1, wherein the horizontal axis is positioned in the area of the rear end of the loading area of the motor vehicle.

8. The load lifter according to claim 1, wherein the suspension device can attach to various locations on an upper transverse beam of the load support.

9. The load lifter according to claim 1, wherein the counter-support is positioned on the outer support that is not attached to a roof of the motor vehicle body.

* * * * *